US008868006B2

(12) United States Patent  
Cox et al.

(10) Patent No.: US 8,868,006 B2  
(45) Date of Patent: Oct. 21, 2014

(54) BI-DIRECTIONAL SIGNAL INTERFACE

(75) Inventors: Charles Cox, Carlisle, MA (US); Edward Ackerman, Needham, MA (US)

(73) Assignee: Photonic Systems, Inc., Billerica, MA (US)

(*) Notice: Subject to any disclaimer, the term of this patent is extended or adjusted under 35 U.S.C. 154(b) by 0 days.

(21) Appl. No.: 12/471,312

(22) Filed: May 22, 2009

(65) Prior Publication Data

US 2009/0247074 A1 Oct. 1, 2009

Related U.S. Application Data

(62) Division of application No. 10/710,463, filed on Jul. 13, 2004, now Pat. No. 7,555,219.

(60) Provisional application No. 60/488,748, filed on Jul. 14, 2003.

(51) Int. Cl.
    *H04B 1/38*     (2006.01)  
    *H04B 10/2575*     (2013.01)  
    *H04B 1/48*     (2006.01)

(52) U.S. Cl.
CPC ...... *H04B 10/2575* (2013.01); *H04B 10/25759* (2013.01); *H04B 1/48* (2013.01); *H04B 2210/006* (2013.01)  
USPC .................. 455/73; 455/80; 455/81; 455/83; 455/121

(58) Field of Classification Search
USPC ............ 455/81, 73, 83, 121, 127.2, 127.3, 80  
See application file for complete search history.

(56) References Cited

U.S. PATENT DOCUMENTS 2,973,512 A    2/1961   Walsh  
4,719,412 A    1/1988   d'Humieres et al.  
(Continued)

FOREIGN PATENT DOCUMENTS

EP    0282293 A2    9/1988  
FR    2796766 A1    1/2001  
(Continued)

OTHER PUBLICATIONS

"Notification of Transmittal of The International Search Report and The Written Opinion of The International Searching Authority, or The Declaration" for PCT/US08/003297, Jul. 4, 2008, 11 Pages, The International Searching Authority/EPO, Rijswijk, The Netherlands.

(Continued)

*Primary Examiner* — Tuan Pham  
(74) *Attorney, Agent, or Firm* — Kurt Rauschenbach; Rauschenbach Patent Law Group, LLC

(57) ABSTRACT

A bi-directional signal interface includes a first waveguide that propagates a first traveling wave. The first waveguide has one end that is coupled to a RF input port that receives a RF transmission signal and another end that is coupled to a RF bi-directional port that receives a RF reception signal and that transmits the RF transmission signal. A second waveguide is positioned proximate to the first waveguide. The second waveguide has one end that is coupled to an output port that passes the received RF reception signal. A non-reciprocal coupler couples fields from the first waveguide to the second waveguide so that the RF reception signal from the bi-directional port couples from the first waveguide to the second waveguide in a substantially non-reciprocal manner and then passes through the output port, and the RF transmission signal from the RF input port passes through the first waveguide to the RF bi-directional port.

18 Claims, 14 Drawing Sheets

(56) References Cited

U.S. PATENT DOCUMENTS

| | | | | |
|---|---|---|---|---|
| 4,857,935 A | * | 8/1989 | Bates | 342/128 |
| 4,908,820 A | * | 3/1990 | Ayasli | 370/276 |
| 5,010,342 A | * | 4/1991 | Jones, Jr. | 342/169 |
| 5,074,631 A | | 12/1991 | Hamano et al. | |
| 5,105,166 A | * | 4/1992 | Tsukii et al. | 330/277 |
| 5,287,212 A | | 2/1994 | Cox et al. | |
| 5,303,079 A | | 4/1994 | Gnauck et al. | |
| 5,369,381 A | | 11/1994 | Gamand | |
| 5,389,782 A | | 2/1995 | Hilliard | |
| 5,602,387 A | | 2/1997 | Bowen | |
| 5,977,911 A | | 11/1999 | Green et al. | |
| 6,028,695 A | | 2/2000 | Uemura et al. | |
| 6,081,232 A | | 6/2000 | Pittman et al. | |
| 6,137,442 A | | 10/2000 | Roman et al. | |
| 6,175,672 B1 | | 1/2001 | Newberg et al. | |
| 6,236,285 B1 | * | 5/2001 | Konishi et al. | 333/1.1 |
| 6,295,395 B1 | | 9/2001 | Paek | |
| 6,310,706 B1 | | 10/2001 | Heidemann et al. | |
| 6,320,539 B1 | | 11/2001 | Matthews et al. | |
| 6,330,098 B1 | | 12/2001 | Gopalakrishnan | |
| 6,337,660 B1 | | 1/2002 | Esman et al. | |
| 6,393,177 B2 | | 5/2002 | Paek | |
| 6,525,855 B1 | | 2/2003 | Westbrook et al. | |
| 2002/0012500 A1 | | 1/2002 | Paek | |
| 2002/0106141 A1 | | 8/2002 | Gopalakrishnan | |
| 2003/0147581 A1 | | 8/2003 | Doi et al. | |
| 2004/0119551 A1 | * | 6/2004 | Wray | 333/22 R |
| 2007/0189778 A1 | | 8/2007 | Burns et al. | |

FOREIGN PATENT DOCUMENTS

| | | |
|---|---|---|
| JP | 57197934 | 12/1982 |
| JP | S57197934 | 12/1982 |
| JP | 09008737 | 1/1997 |
| WO | 2005008832 A2 | 1/2005 |

OTHER PUBLICATIONS

"Notification of Transmittal of The International Search Report and The Written Opinion of The International Searching Authority, or The Declaration" for PCT/US07/03729, May 30, 2008, 8 Pages, The International Searching Authority/EPO, Rijswijk, The Netherlands.
"Notification of Transmittal of The International Search Report and The Written Opinion of The International Searching Authority, or The Declaration" for PCT/US04/022498, Dec. 23, 2004, 13 Pages, The International Searching Authority/EPO, Rijswijk, The Netherlands.
"Office Action" for U.S. Appl. No. 10/710,463, Apr. 9, 2008, 7 pages, The USPTO, US.
"Office Action" for U.S. Appl. No. 11/353,701, Jul. 25, 2008, 6 pages, The USPTO, US.
"Notification Concerning Transmittal of International Preliminary Report on Patentability (Chapter I of The Patent Cooperation Treaty)" for PCT/US2009/041058, Nov. 4, 2010, 6 pages, The International Bureau of WIPO, Geneva, Switzerland.
"Notification Concerning Transmittal of International Preliminary Report on Patentability (Chapter I of The Patent Cooperation Treaty)" for PCT/US2008/003297, Oct. 1, 2009, 8 pages, The International Bureau of WIPO, Geneva, Switzerland.
"Office Action" issued Jan. 7, 2011, For Korean Patent Application No. 10-2009-7014602, 5 pages, Korean Intellectual Property Office, Korea.
"Response to Office Action" filed Jan. 31, 2011, For Korean Patent Application No. 10-2009-7014602, 15 pages.
"Office Action" issued Sep. 6, 2011, For Korean Patent Application No. 10-2009-7014602, 7 pages, Korean Intellectual Property Office, Korea.
"Response to Office Action" filed Jan. 6, 2012, For Korean Patent Application No. 10-2009-7014602, 50 pages.
"Office Action" issued May 2, 2012, For Korean Patent Application No. 10-2009-7014602, 9 pages, Korean Intellectual Property Office, Korea.
"Response to Office Action" filed Nov. 2, 2012, For Korean Patent Application No. 10-2009-7014602, 19 pages.
Pozar, David M., Microwave Engineering, 2nd Edition, 1998, pp. 557-559, Chapter 10, sub-section of section 10:1 Noise Figure of a Cascaded System, John Wiley & Sons, Inc., New York.
Anderson, Is A Broadband Low Noise Photonic Link An Oymoron?, Proc. 10th Photonic Systems for Antenna Applications Conf., Jan. 2000, Naval Postgraduate School, Monterrey, CA, US.
Ackerman, et al., The Effect Of A Mach-Zehnder Modulator's Travelling Wave Electrode Loss On A Photonic Link's Noise Figure, Microwave Photonics 2003, MWP 2003 Proceedings, Sep. 12, 2003, pp. 321-324, Photonic Systems, Inc. Burlington, MA, US.
Wenzel, Charles, Low Frequency Circulator/Isolator Uses No Ferrite or Magnet, RF Design Awards C. Wenzel, RF Design, Jul. 1991.
Hickman, Ian, "Analog Circuits Cookbook", 2nd Edition, 1999, pp. 178-190, Newnes, Boston, MA, USA.

* cited by examiner

| Port-to-Port Connection | Desired Coupling Efficiency | Mechanism |
|---|---|---|
| Input to bi-directional | High | Direct connection |
| Bi-directional to input | Do not care | |
| Output to bi-directional | Low | Non-reciprocal coupling |
| Bi-directional to output | High | |
| Input to output | Low | Traveling wave waveguides |
| Output to input | Low | |

FIG. 2B

BI-DIRECTIONAL SIGNAL INTERFACE

CROSS REFERENCE TO RELATED APPLICATIONS

This application is a divisional of U.S. patent application Ser. No. 10/710,463, filed on Jul. 13, 2004, entitled "Bi-Directional Signal Interface," which claims priority to U.S. Provisional Patent Application Ser. No. 60/488,748, filed on Jul. 14, 2003, entitled "Bi-directional Antenna Interface and Optical Link with Low Intrinsic Noise Figure." The entire disclosures of these patent applications are incorporated herein by reference.

BACKGROUND OF INVENTION

This invention relates generally to signal interfaces, such as antenna signal interfaces, that perform both transmit and receive functions. An antenna is a conductive structure that can carry an electrical current. Antennas can be used to transmit and receive electromagnetic waves. If a time varying electrical current is electrically coupled to an antenna, the antenna will radiate an electromagnetic wave. If a time-varying electromagnetic field is received by an antenna, the antenna will generate a time varying electrical current.

Signal interfaces are used to efficiently transfer power. For example, an antenna signal interface is used to efficiently transfer power between an antenna and transmit and/or receive electronics. A transmitter antenna interface is designed to transfer power efficiently from a transmission line that electrically couples a transmitter to the antenna. A receiver antenna interface is designed to transfer power efficiently from the antenna to a transmission line that is electrically coupled to a receiver. A transceiver antenna interface is a bi-directional interface that is designed to transfer power efficiently from a transmission line that is electrically coupled to a transmitter to the antenna and also is designed to transfer power efficiently from the antenna to a transmission line that is electrically coupled to a receiver.

BRIEF DESCRIPTION OF DRAWINGS

FIG. 2B presents a table that illustrates the electromagnetic coupling between pairs of ports of the bi-directional signal interface of FIG. 2A and how that coupling is achieved.

DETAILED DESCRIPTION

Figure 1A:
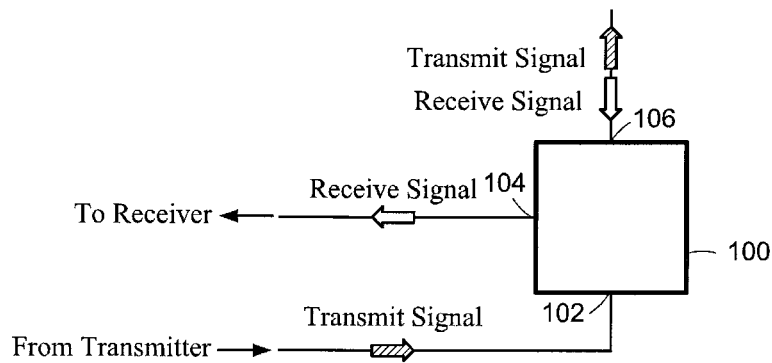
FIG. 1A illustrates a general bi-directional signal interface that is known in the art.

FIG. 1A illustrates a general bi-directional signal interface 100 that is known in the art. The signal interface 100 includes an input port 102 that receives a transmission signal and an output port 104 that passes a reception signal. The signal interface 100 includes a bi-directional port 106 for transmitting and receiving signals.

The signal interface 100 is used to transfer power between the bi-directional port 106 and transmit and receive electronics in a communication system. Known signal interfaces are designed to transfer power efficiently from a transmission line that is electrically coupled to a transmitter to the bi-directional port 106 and also to transfer power efficiently from the bi-directional port 106 to a transmission line that is electrically coupled to a receiver. Known signal interfaces are also designed to isolate the receiver from the transmitter in order to achieve high transmit-receive signal isolation.

Figure 1B:
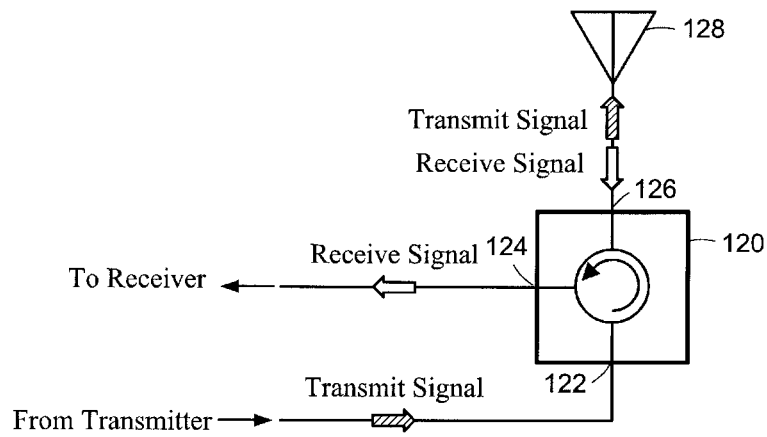
FIG. 1B illustrates a known bi-directional signal interface that includes an electronic circulator.

FIG. 1B illustrates a known bi-directional signal interface that includes an electronic circulator 120, such as a ferrite circulator. The circulator 120 includes an input port 122 that receives a transmission signal from a transmitter and an output port 124 that passes a reception signal to a receiver. The circulator 120 also includes a bi-directional port 126 for transmitting and receiving signals. An antenna 128 is electrically connected to the bi-directional port 126.

The circulator 120 permits full-duplex operation where transmission and reception can occur simultaneously in time. A circulator is a three port non-reciprocal electronic device that is well known in the art. Signals coupled into one port of the circulator are directed to a subsequent port, but not vice versa. In operation, a transmission signal from a transmitter propagates into the input port 122 of the circulator 120 and is directed to the bi-directional port 126, which is electrically coupled to the antenna 128. A signal received from the antenna 128 propagates into the bi-directional port 126 and is directed to the output port 124 that is connected to a receiver.

In theory, the entire transmitted signal propagating into the input port 122 is directed to the bi-directional port 126, which is coupled to the antenna 128; and the entire received signal propagating into the bi-directional port 126 is directed to the output port 124 that is coupled to the receiver. However, in practice a small portion of the transmission signal propagating into the input port 122 leaks to the output port 124.

Circulator-type bi-directional electronic antenna interfaces are often used in conjunction with amplifiers. For example, the input port 122 of the circulator 120 can be coupled to a transmit driver amplifier that is used increase the amplitude of the transmission signal. The output port 124 of the circulator 120 can be coupled to a low noise amplifier (LNA) that is used to amplify the received signal.

The circulator 120 provides inadequate isolation between the transmitter and the receiver for many applications. Receiver-transmitter isolation is necessary because a typical transmission power level can be 10.0-10 W and typical LNAs can be damaged by input powers ranging from 1-10 mW (depending on the size and bandwidth of the LNA). Thus, a minimum of 30 dB of receive-transmit isolation is typically required. For many applications the receive-transmit isolation should be greater than 100 dB. Commercially available electronic circulators provide isolation of about 14 dB at frequencies up to 10 GHz, but only over fractional bandwidths of 3:1 or less. However, the magnitude of the isolation decreases as the fractional bandwidth increases. Consequently, input power limiting devices, such as diodes, are sometimes used to protect the sensitive LNA from damage. Furthermore, such wideband circulators typically have a significant loss that can be on order of 1 dB. This loss adds to the minimum receiver noise figure and cannot be recovered by subsequent stages of amplification.

Receiver-transmitter isolation is also necessary to perform simultaneously transmission and reception at the same or different frequencies. Poor receiver-transmitter isolation can result in some "leaking" or "bleed-through," where transmission signals propagate in receiver channels. Bleed-through of a stronger transmit signal can prevent the receiver from detecting the weaker desired receive signal.

In addition, circulators are relatively large and heavy devices because they include permanent magnets that are required to induce the non-reciprocal performance in the circulator material. The size and weight of the circulators is undesirable for many applications, such as phased array antenna applications and space-based and airborne applications.

Figure 1C:
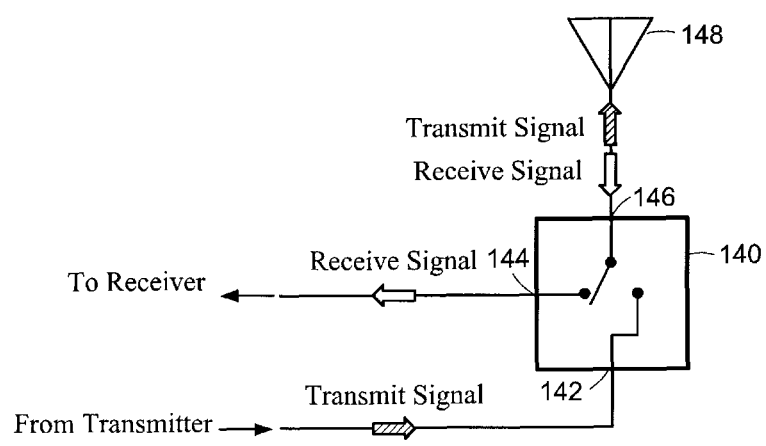
FIG. 1C illustrates a known bi-directional signal interface that includes a switch.

FIG. 1C illustrates a known bi-directional signal interface that includes an electronic switch 140. The switch 140 includes an input port 142 that receives a transmission signal from a transmitter and an output port 144 that passes a reception signal to a receiver. The switch 140 also includes a bi-directional port 146 for transmitting and receiving signals. An antenna 148 is electrically connected to the bi-directional port 146.

The switch 140 performs half-duplex operation where it can receive a reception signal or transmit a transmission signal, but can not simultaneously receive a reception signal and transmit a transmission signal. Simultaneous transmission and reception is not possible because the transmission and the received signal cannot overlap in time. The isolation of the input port 142 and the output port 144 of the switch 140 is generally 40 dB, which is greater than the isolation of the input port 122 and the output port 124 of the circulator 120 (FIG. 1B).

Other known antenna interfaces use diplexers. However, diplexers are narrow-bandwidth devices and the transmit and the received signal frequency bands can not overlap in frequency. Diplexers also have relatively high loss. Still other antenna interfaces use couplers and/or taps, but such interfaces have relatively high loss.

Figure 2A:
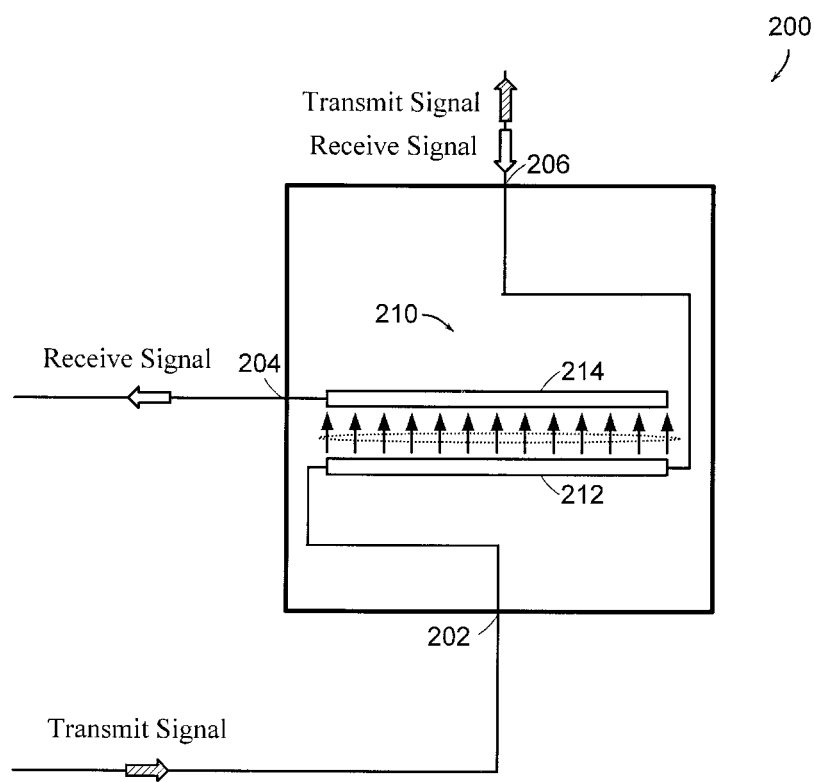
FIG. 2A illustrates a bi-directional signal interface according to the present invention.

FIG. 2A illustrates a bi-directional signal interface 200 according to the present invention. The signal interface 200 includes an input port 202 that receives a transmission signal from a transmitter and an output port 204 that passes a reception signal to a receiver. The signal interface 200 also includes a bi-directional port 206 for transmitting and receiving signals.

The signal interface 200 includes a non-reciprocal waveguide device 210 having a first 212 and a second traveling-wave waveguide 214 that are positioned such that electromagnetic fields couple between the first traveling-wave waveguide 212 and the second traveling-wave waveguide 214 in a non-reciprocal manner. The term "non-reciprocal manner" is defined herein to mean non-reciprocal coupling of electromagnetic fields where electromagnetic fields strongly coupled in one direction and are substantially prevented from coupling in another direction. One known non-reciprocal device is a ferrite circulator, such as the circulator 120 that is described in connection with FIG. 1B. The signal interface of the present invention uses non-reciprocal coupling between two traveling wave waveguides to achieve isolation between the input and output ports.

In one embodiment of the present invention, the non-reciprocal waveguide device 210 is an optical modulator. Optical modulators can provide continuous non-reciprocal coupling. Optical modulators provide good coupling in one direction because the electro-optic material has finite electro-optic coefficients in one direction and has essentially no coupling in the other direction because the electro-optic material has negligible or zero opto-electronic coefficients in the other direction.

In another embodiment of the present invention, the non-reciprocal waveguide device 210 is an electronic distributed amplifier. Distributed amplifiers can provide a lumped element approximation to continuous non-reciprocal coupling. In this embodiment, a distributed amplifier is configured so that it has gain in one direction and substantial loss in the other direction.

In operation, a signal to be transmitted propagates into the input port 202 and is conveyed by a first traveling-wave waveguide 212 to the bi-directional port 206 and is coupled in a non-reciprocal manner to the second traveling wave waveguide 214. A signal received by the bi-directional port 206 is conveyed in a non-reciprocal manner from the first traveling-wave waveguide 212 to the second traveling-wave waveguide 214 and then to the output port 204. Because of the non-reciprocal coupling between waveguides 212 and 214, most of the transmitted signal appears at the bi-directional port 206, while very little of the transmitted signal is coupled to the output port 204.

FIG. 2B shows a table 250 that illustrates the electromagnetic coupling of the non-reciprocal waveguide device 210 of FIG. 2A. The table 250 summarizes the various connections between ports of the bi-directional signal interface 200 (FIG. 2A), the desired coupling between the various port pairs, and the mechanisms that are responsible for achieving the desired coupling. For example, for many applications it is desirable to achieve high coupling efficiency from the input port 202 to the bi-directional port 206, while at the same time achieving an unspecified coupling in the opposite direction. The coupling in the reverse direction could be the same as in the forward direction between this pair of ports 202, 206. Such performance can be achieved in the bi-directional signal interface 200 by directly connecting these two ports 202, 206.

The table 250 indicates that the bi-directional signal interface 200 (FIG. 2A) can achieve low coupling efficiency from the output port 204 (FIG. 2A) to the bi-directional port 206 (FIG. 2A) while simultaneously achieving high coupling efficiency from the bi-directional port 206 to the output port 204. The table 250 also indicates that the bi-directional signal interface 200 can achieve low coupling efficiency between the input port 202 and the output port 204 in either direction.

The bi-directional signal interface 200 can achieve these results because of the non-reciprocal manner in which the two traveling waveguides 212, 214 couple.

Figure 3A:
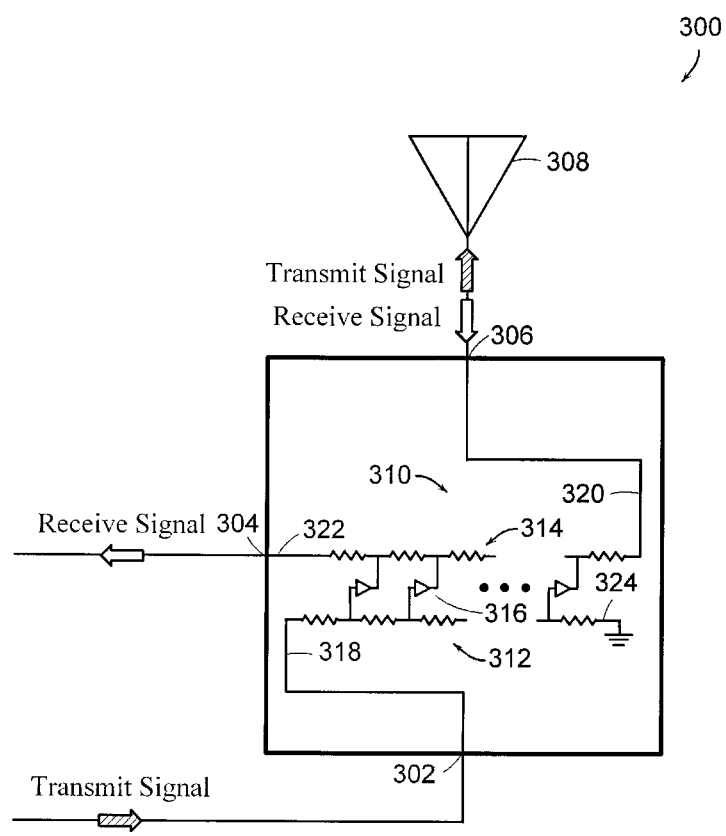
FIG. 3A illustrates one embodiment of an electronic bi-directional antenna interface according to the present invention.

FIG. 3A illustrates one embodiment of an electronic bi-directional antenna interface 300 according to the present invention. The antenna interface 300 includes an input port 302 that receives a transmission signal from a transmitter and an output port 304 that passes a reception signal to a receiver. The antenna interface 300 also includes a bi-directional port 306 for transmitting and receiving signals. An antenna 308 is electrically connected to the bi-directional port 306.

In addition, the antenna interface 300 includes a traveling-wave amplifier 310. The traveling-wave amplifier 310 has a first 312 and a second traveling-wave waveguide 314 that are electrically coupled in a non-reciprocal manner by means of a plurality of relatively low-gain amplifier stages 316. The outputs of successive low-gain amplifier stages 316 in the traveling wave amplifier 310 are connected together by feeding taps placed along the second traveling-wave waveguide 314.

The input port 302 is electrically connected to the input 318 of the first traveling-wave waveguide 312. The bi-directional port 306 is electrically connected to an output 320 of the second traveling-wave waveguide 314. The output port 304 is electrically connected to the input 322 of the second traveling-wave waveguide 314. The output 324 of the first traveling-wave waveguide 312 is terminated by its characteristic impedance.

Traveling-wave amplifiers are well known in the art and are often used to provide high-gain amplification over a wide-bandwidth (e.g., 1-20 GHz). The traveling-wave amplifier 310 provides high-gain amplification in one direction by non-reciprocally coupling signals between the first 312 and the second traveling-wave waveguide 314 with the plurality of low-gain amplifier stages 316.

In operation, as a transmission signal travels along the first traveling-wave waveguide 312, a portion of the energy in the transmission signal is tapped off and fed into the low-gain amplifier stages 316 so as to produce an amplified output signal. Half of the transmit power, however, is transferred to the output port 304 because the outputs of the individual low-gain amplifier stages 316 generate signals that travel in both directions along the second traveling-wave waveguide 314. It may be necessary to block some of the transmission signal from the output port 304 in some applications, such as when the receive device is an LNA and high transmit powers are used.

Figure 3B:
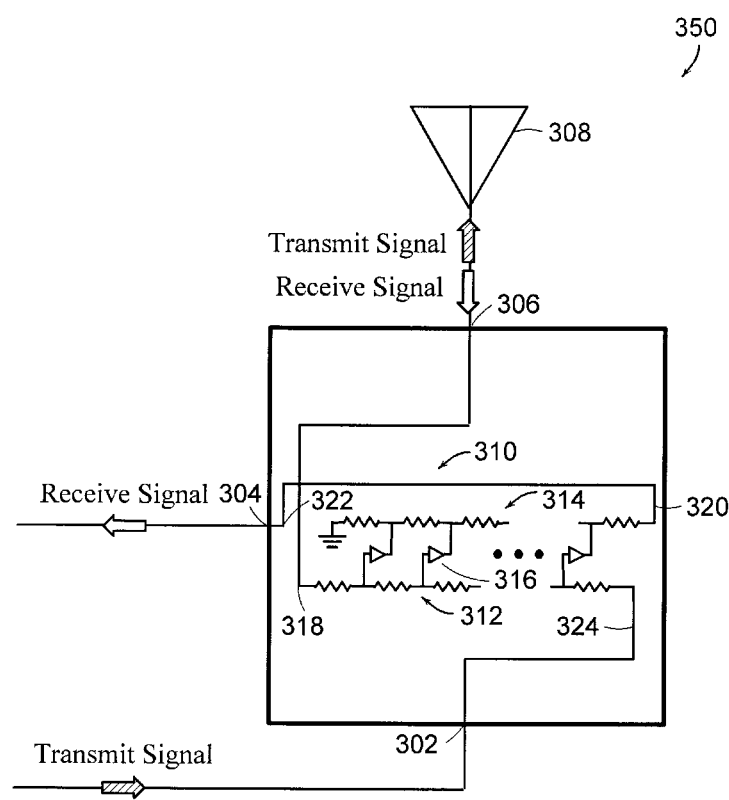
FIG. 3B illustrates another embodiment of an electronic bi-directional antenna interface according to the present invention.

FIG. 3B illustrates another embodiment of an electronic bi-directional antenna interface 350 according to the present invention. The antenna interface 350 is similar to the antenna interface 300 of FIG. 3A. However, in the antenna interface 350, the distributed amplifier 316 is configured differently. In the interface 350, the input port 302 is electrically connected to output 324 of the first traveling-wave waveguide 312. The antenna 308 is connected to the input 318 of the first traveling-wave waveguide 312. The output port 304 is electrically connected to the output 320 of the second traveling-wave waveguide 314.

In full duplex operation, the reception signal propagates through the traveling wave amplifier 310 where it is amplified. The transmission signal is fed "backwards" along the first traveling-wave waveguide 312 to the antenna 308. The transmit power appears at the input of each of the low-gain amplifier stages 316 so some input protection may be required. Half-duplex operation can be achieved by switching the power to the distributed amplifier 316.

The electronic bi-directional antenna interface 350 described in connection with FIG. 3B can provide a relatively low noise figure because the receive signal at the bi-directional port 306 feeds the input to the distributed amplifier 310. However, the bandwidth of the electronic bi-directional antenna interfaces 300, 350 is less than the bandwidth of photonic devices. For applications that require an extremely broad bandwidth bi-directional signal interface, such as those applications with fractional bandwidths on the order of 100:1, a photonic embodiment of the bi-directional signal interface can be used.

Figure 4A:
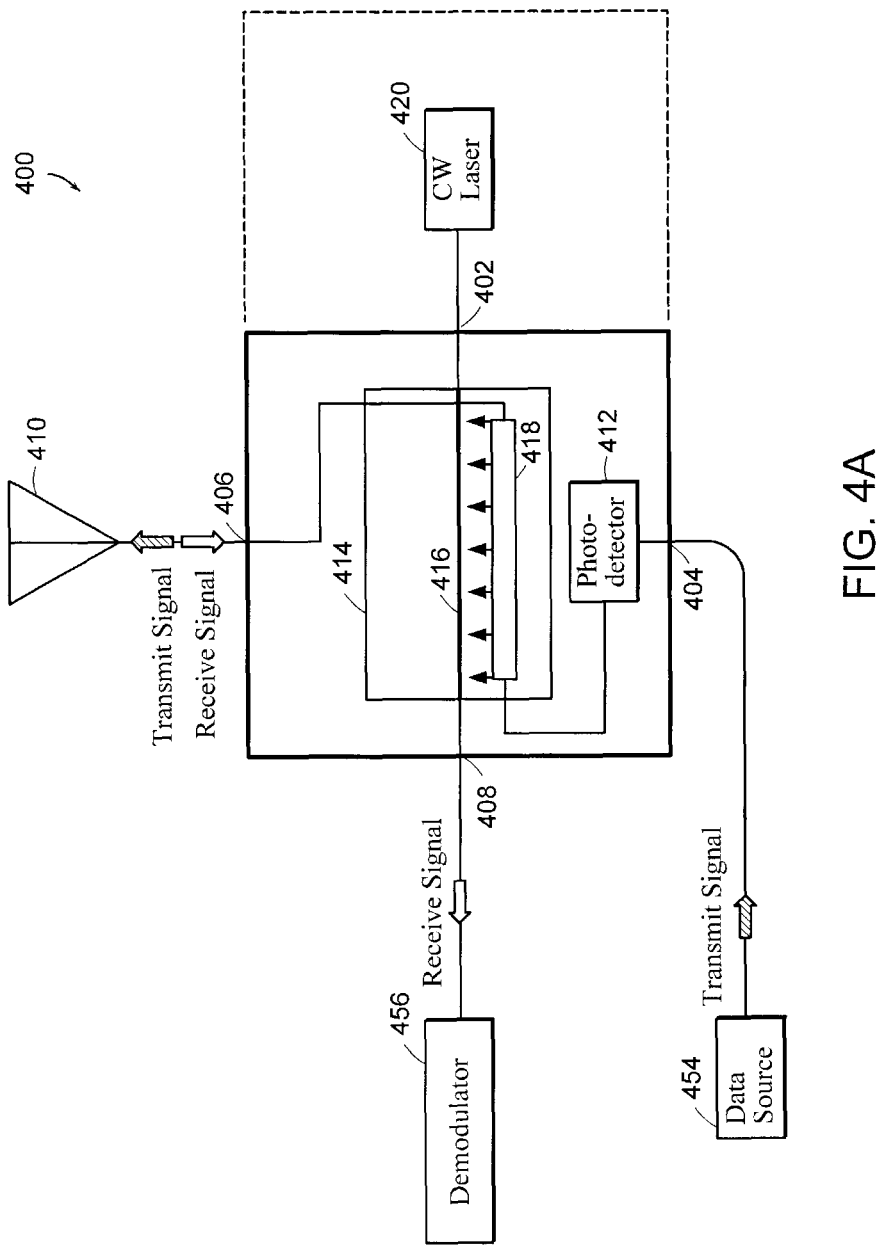
FIG. 4A illustrates an electro-optic bi-directional antenna interface according to the present invention that provides full-duplex operation.

FIG. 4A illustrates an electro-optic bi-directional antenna interface 400 according to the present invention that provides full-duplex operation. The antenna interface 400 includes an optical input port 402, a RF input port 404, a RF bi-directional port 406, and an optical output port 408. An antenna 410 is electrically coupled to the RF bi-directional port 406. An output of a photodetector 412, such as a photodiode, is electrically coupled to the RF input port 404.

The antenna interface 400 also includes an electro-optic modulator 414 having an optical waveguide 416 and an electrical waveguide 418 that is positioned in electro-optic communication with the optical waveguide 416. The term "electro-optic communication" is defined herein to mean coupling between the RF and the optical fields via the electro-optic coefficient of the optical waveguide material. Electro-optic communication occurs when the RF field changes the optical index of refraction via the electro-optic (e-o) coefficient.

One end of the optical waveguide 416 is optically coupled to a continuous-wave (CW) laser 420 that generates a CW optical beam. The other end of the optical waveguide 416 is optically coupled to the optical output port 408. One end of the electrical waveguide 418 is electrically coupled to the RF input port 404. The other end of the electrical waveguide 418 is electrically coupled to the RF bi-directional port 406.

In operation, a reception signal is received by the antenna 410 and then propagates through the RF bi-directional port 406 and into the electrical waveguide 418. The reception signal is then coupled to the CW optical beam propagating in the optical waveguide 416 in a non-reciprocal manner with respect to the transmission signal that propagates in the TW electrode structure 418. The modulated CW optical beam propagates through the optical output port 408.

The non-reciprocal coupling between two waveguides that was discussed in connection with the bi-directional signal interface 200 can be enhanced by introducing a second electro-magnetic wave that propagates through the second traveling wave waveguide. Efficient coupling between the electrical waveguide 418 and the optical waveguide 414 can be achieved when the propagation velocities in the two waveguides are matched, which is the so-called velocity match condition. This is the case when the reception signal on the electrical traveling wave waveguide 418 is co-propagating with the optical wave in waveguide 414. Conversely there will be inefficient coupling between the two waveguides when the propagation velocities are mis-matched. An extreme case of propagation velocity mismatch occurs when the signal on the electrical traveling wave waveguide 418 is propagating in the opposite direction to the propagation direction of the optical wave waveguide 414. This is the case when the transmission signal on the electrical traveling wave waveguide 418 is counter-propagating with the optical wave in waveguide 414

A RF transmission signal, which is modulated onto an optical carrier, propagates into the photodetector 412 where it is converted back to a RF transmission signal. The RF transmission signal propagates into the electrical waveguide 418 and then through the RF bi-directional port 406 to the antenna 410 where it is radiated by the antenna 410. The electro-optic bi-directional antenna interface 400 can provide full-duplex operation since it can receive the reception signal and transmit the transmission signal simultaneously in time.

Full-duplex operation is achieved because the antenna interface is a linear network and, thus fields are being superimposed in a linear network. Therefore, the response of the antenna interface 400 to multiple stimulations is equivalent to the sum of the responses of the antenna interface 400 to each stimulation applied individually with all the other stimulations equal to zero. For example, the electrical waveguide 418 only sees the output impedance of the antenna as the termination load when the transmission signal is propagating and the reception signal is equal to zero. Also, the electrical waveguide 418 only sees the output impedance of the transmit driver as the termination load when the reception signal is propagating and the transmission signal is equal to zero.

Figure 4B:
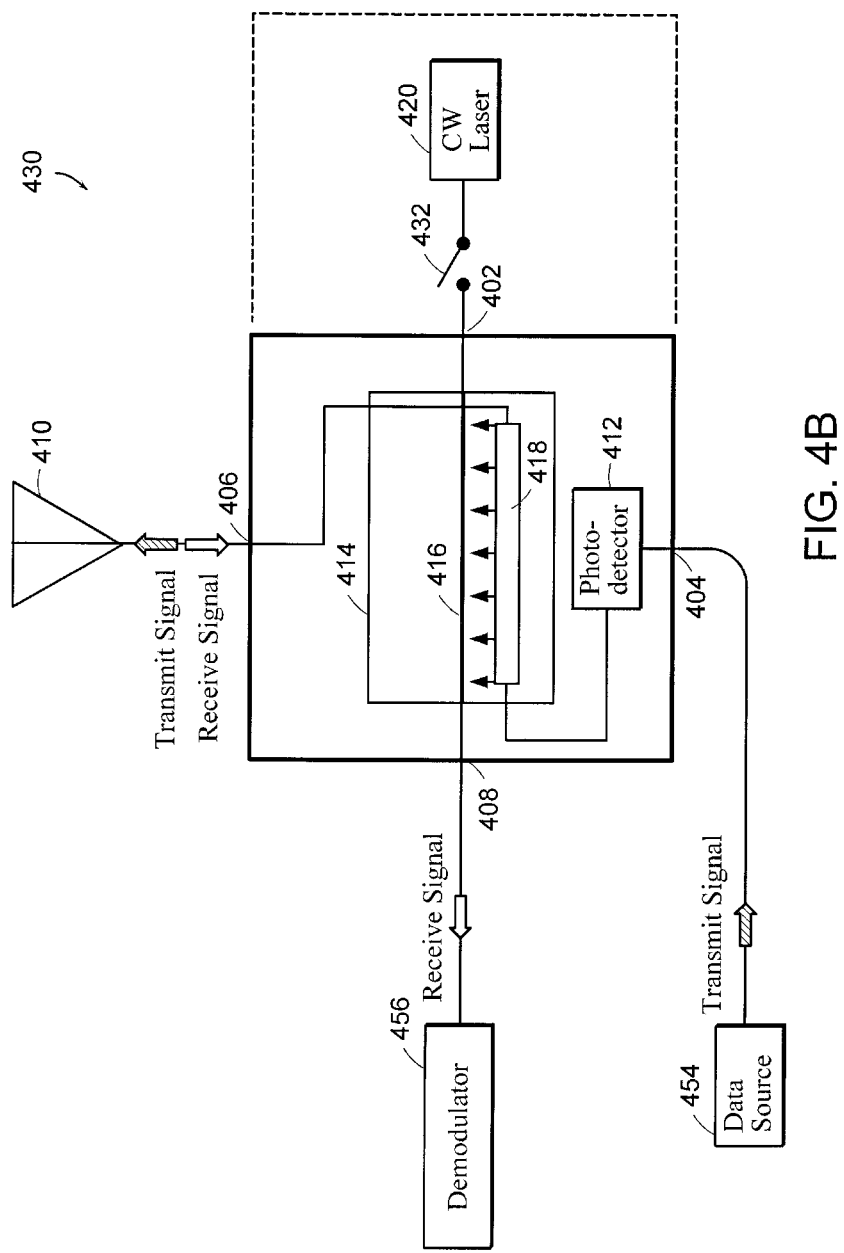
FIG. 4B illustrates an electro-optic bi-directional antenna interface according to the present invention that provides half-duplex operation with relatively high transmit-receive port isolation.

FIG. 4B illustrates an electro-optic bi-directional antenna interface 430 according to the present invention that provides half-duplex operation with relatively high transmit-receive port isolation. The antenna interface 430 is similar to the antenna interface 400 of FIG. 4A. However, the antenna interface 430 includes an optical switch 432 that is optically coupled between the CW laser 420 and the and the optical input port 402.

The operation of the antenna interface 430 is similar to the operation of the antenna interface 400 of FIG. 4A. However, the optical switch 432 is opened during transmission to extinguish the CW optical beam in order to prevent signals from appearing at the optical output port 408 during transmission. Extinguishing the CW optical beam during transmission increases the transmit-receive port isolation. In other embodiments, the electrical or optical pump that stimulates optical emissions in the CW laser 420 is controlled to extinguish the CW optical beam. In yet other embodiments, the electro-optic modulator 414 is controlled to minimize the power at the output port 408 of the interface.

Figure 4C:
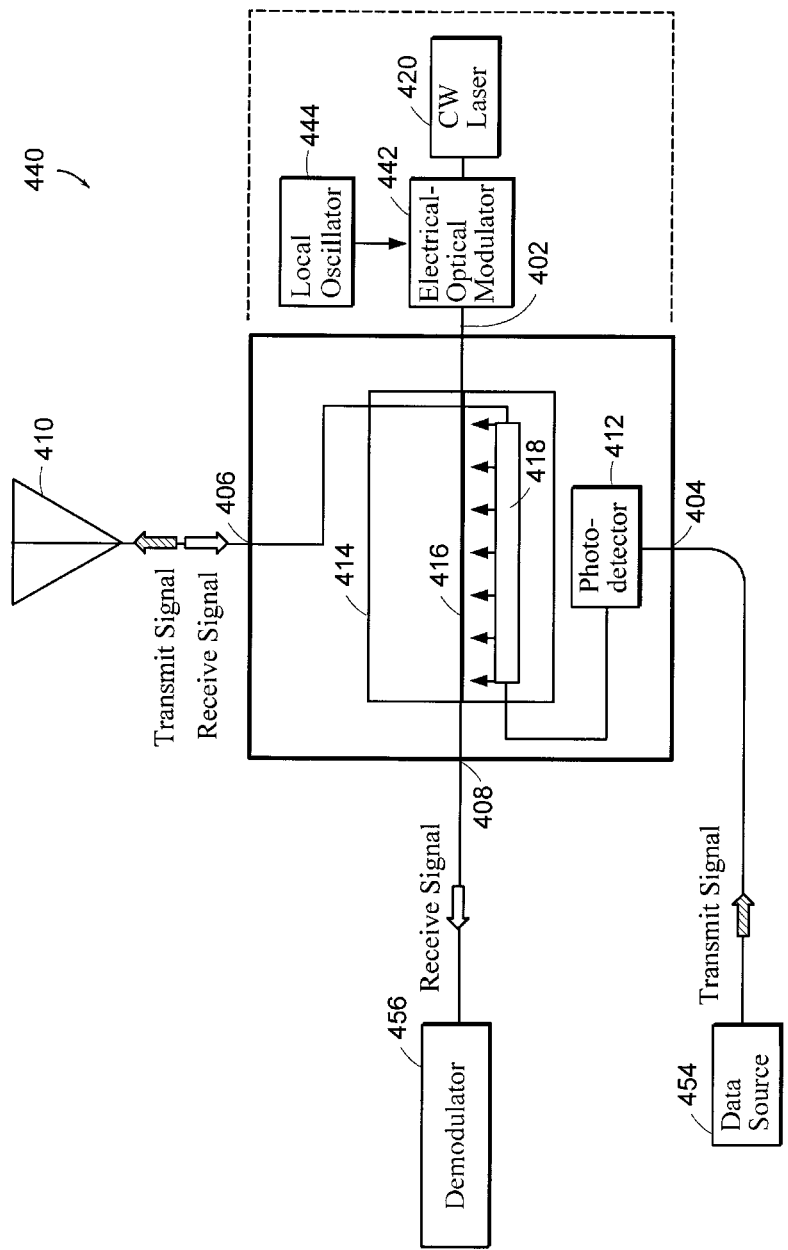
FIG. 4C illustrates an electro-optic bi-directional antenna interface according to the present invention that modulates the continuous-wave optical beam with a local oscillator signal.

FIG. 4C illustrates an electro-optic bi-directional antenna interface 440 according to the present invention that modulates the CW optical beam with a local oscillator. The antenna interface 440 is similar to the antenna interface 400 of FIG. 4A. However, the antenna interface 440 includes an electro-optic modulator 442 that is optically coupled between the output of the CW laser 420 and the optical input port 402. The antenna interface 440 also includes a local oscillator 444 having an output that is electrically connected to an RF input of the electro-optic modulator 442.

The operation of the antenna interface 440 is also similar to the operation of the antenna interface 400 of FIG. 4A. However, the electro-optic modulator 442 in the antenna interface 440 modulates the CW optical beam with a single frequency local oscillator signal. The electro-optic modulator 414 modulates the reception signal onto the CW optical beam that is modulated by the single frequency local oscillator signal. The resulting optical signal at the output port 408 is the reception signal received at the bi-directional port 406 translated in frequency by the frequency of the signal generated by the local oscillator 444 and modulated onto the CW optical beam.

Figure 4D:
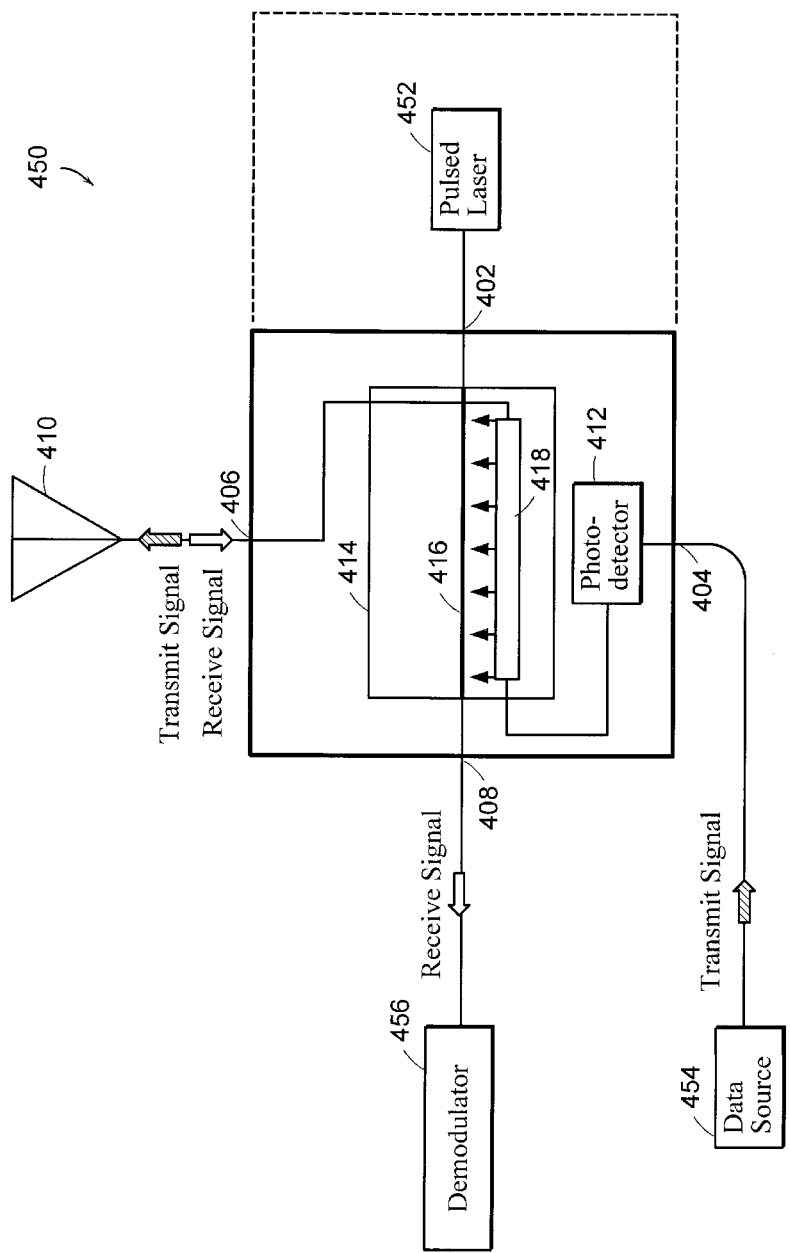
FIG. 4D illustrates an electro-optic bi-directional antenna interface according to the present invention that includes a pulsed laser that generates the optical carrier.

FIG. 4D illustrates an electro-optic bi-directional antenna interface 450 according to the present invention that includes a pulsed laser 452 that generates the optical carrier. The antenna interface 450 is similar to the antenna interface 400 of FIG. 4A. However, the antenna interface 450 includes the pulsed laser 452 that generates a pulsed optical beam.

The operation of the antenna interface 450 is also similar to the operation of the antenna interface 400 of FIG. 4A. However, the reception signal modulates the pulsed optical beam that is generated by the pulsed laser 452. When the pulsed optical beam is acted upon by the reception signal that propagates into the bi-directional port 406 from the antenna 410, a periodically sampled version of the reception signal is generated at the optical output port 408.

The electro-optic bi-directional antenna interfaces shown in FIGS. 4A-D can be configured as a transceiver that transmits and receives data. A transceiver according to the present invention includes an optical data source 454 that is optically coupled to the optical input of the photodetector 412. The optical data source 454 generates the data for transmission by the transceiver. The transceiver also includes a demodulator 456 that is optically coupled to the optical output port 408. For example, the demodulator 456 can include a photodetector that converts the optical signal to a RF reception signal and an electronic demodulator that demodulates the RF reception signal.

Figure 4E:
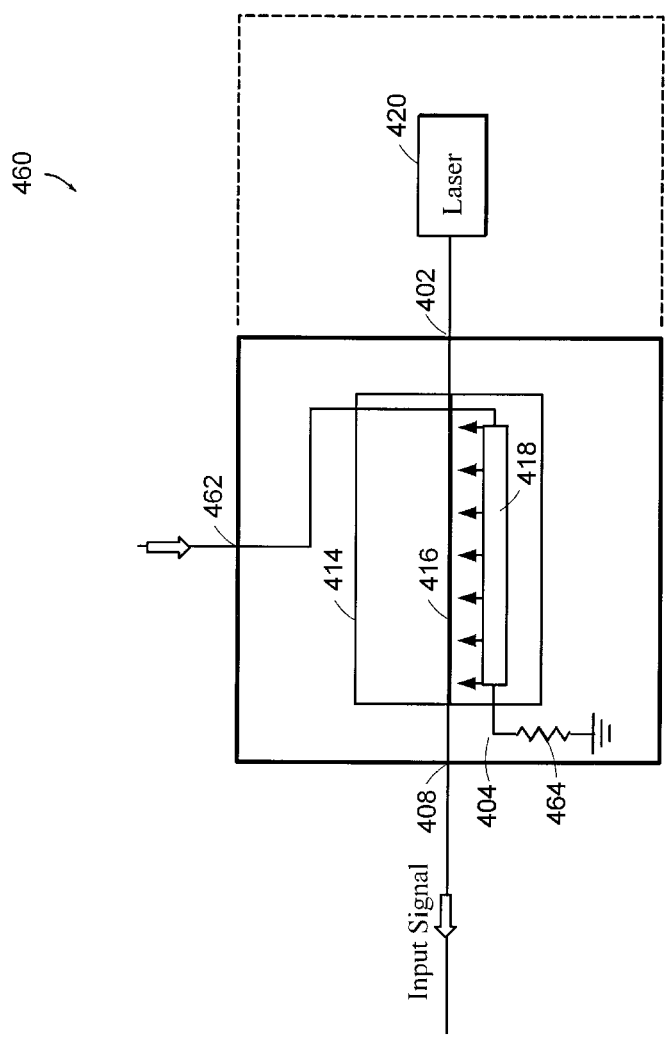
FIG. 4E illustrates an electro-optic uni-directional antenna interface according to the present invention.

FIG. 4E illustrates an electro-optic uni-directional signal interface 460 according to the present invention. The signal interface 460 is similar to the antenna interface 400 of FIG. 4A. However, the signal interface 460 includes an uni-directional port 462 that is designed to only receive the reception signal and not to transmit a transmission signal. In addition, the RF electrical input port 404 is terminated by an impedance 464, such as the characteristic impedance of the electrical waveguide 418.

The operation of the signal interface 460 is also similar to the operation of the antenna interface 400 of FIG. 4A. However, the reception signal path is effectively isolated from any noise generated by the termination impedance 464 over a range of operating frequencies in the same manner as the transmission signal is isolated from the reception signal in the antenna interface 400. Minimizing noise at the optical output 408 improves the signal-to-noise ratio of receiver connected to the signal interface 460.

Minimizing noise at the optical output 408 is important for electro-optic embodiments of the bi-directional signal interface according to the present invention because these interfaces cannot include a LNA between the antenna and RF bi-directional port. A LNA cannot be used because the transmission signal also travels along the signal path between the antenna and the RF bi-directional port. Consequently, for many applications of the signal interface of the present invention, it is desirable to achieve a low noise figure without using a conventional electronic LNA.

To achieve a minimum noise figure in many practical communication systems without using a LNA requires minimizing the sources of noise in a link, such as the laser RIN. In addition, the modulator must have a low enough switching voltage to be sufficiently sensitive. Modulators with the required sensitivity and bandwidth are presently being developed. For example, a Mach-Zehnder modulator with a $V_\pi$ of <0.3 V is being developed by the assignee of the present application. A fiber-optic link with a 5 dB noise figure over a bandwidth of 50 GHz can be achieved when such a modulator is combined with a low noise laser.

Figure 5:
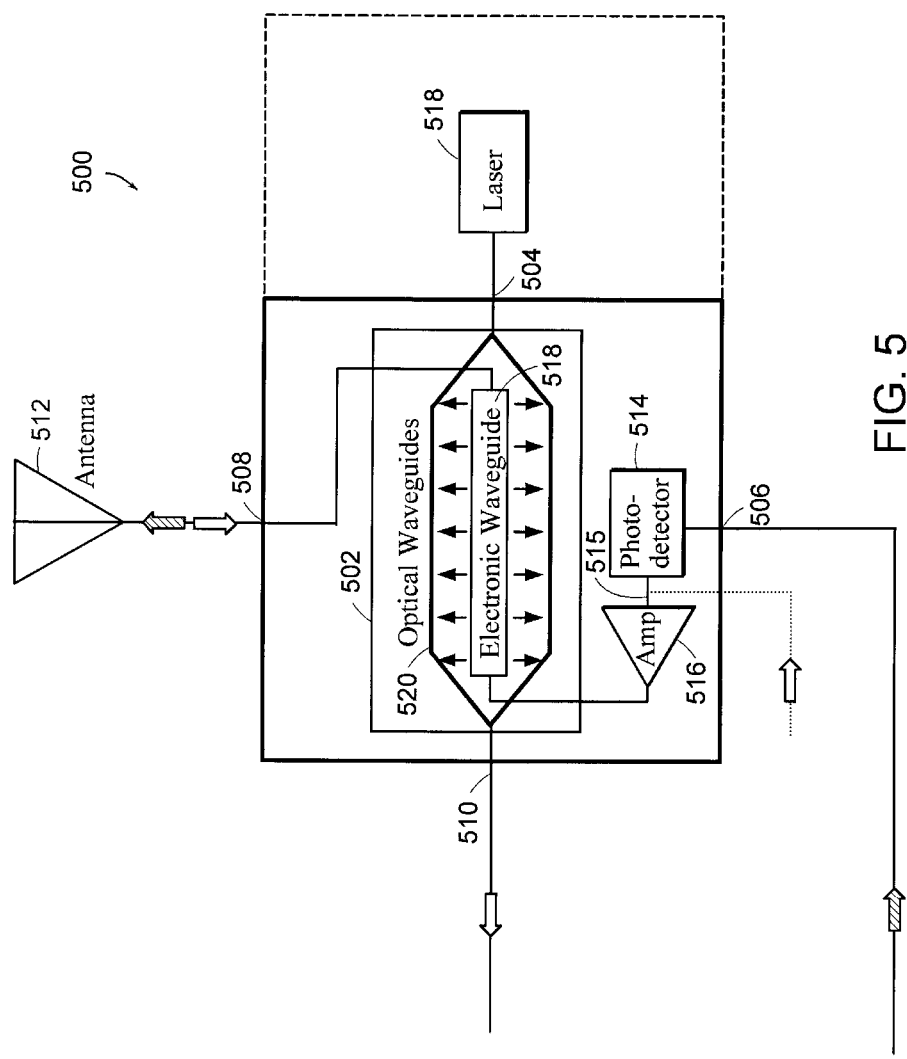
FIG. 5 illustrates an embodiment of the bi-directional electro-optic antenna interface according to the present invention that includes a Mach-Zehnder modulator.

FIG. 5 illustrates an embodiment of the bi-directional electro-optic antenna interface 500 according to the present invention that includes a Mach-Zehnder (MZ) interferometric modulator 502. The antenna interface 500 includes an optical input port 504, an optical transmission signal input port 506, a RF bi-directional port 508, and an optical output port 510. An antenna 512 is electrically coupled to the RF bi-directional port 508. The optical transmission signal input port 506 is optically connected to an input of a photodetector 514, such as a photodiode. An output of the photodetector 514 is electrically connected to an input 515 of a driver amplifier 516. In some embodiments, a RF transmission signal is fed directly to the input 515 of the driver amplifier 516 as shown in FIG. 5 by a dotted line. A CW laser 518 is optically coupled to the optical input port 504.

The MZ modulator 502 has an optical input that is optically coupled to the optical input port 504 and has an optical output that is optically coupled to the optical output port 510. The MZ modulator 502 includes a traveling wave (TW) electrode structure 518 and optical waveguides 520. The output of the driver amplifier 516 is electrically connected to the TW electrode structure 518. The output impedance of the driver amplifier 516 terminates one end of the TW electrode structure 518. The impedance of the antenna 512 terminates the other end of the TW electrode structure 518. In one embodiment, the TW electrode structure 518 of the MZ modulator 502 is designed to velocity match the reception signal with the optical field in the CW optical beam. Velocity matching can improve the sensitivity of the MZ modulator while maintaining the bandwidth of the MZ modulator 502.

In one embodiment, the TW electrode structure 518 of the MZ modulator 502 is relatively thick. In this embodiment, the thickness of the TW electrode structure 518 is chosen to be sufficient to transmit signals amplified by the driver amplifier 516 without excessive heating or electrical loss. In one embodiment, the thickness of the TW electrode structure 518 is chosen to achieve a low switching voltage and hence a low link noise figure. In one embodiment, the electrode structure is chosen to provide relatively cool operation with relatively low loss at modest transmission powers (e.g. less than 10 Watts). Such an antenna interface is sufficient for the individual antenna elements of a typical phased array.

In operation, a reception signal is received by the antenna 512 and then propagates through the RF bi-directional port 508 and into the TW electrode structure 518. The reception signal is then coupled to the CW optical beam propagating in the MZ modulator optical waveguides 520 in a non-reciprocal manner. The reception signal is modulated on the CW optical beam. The modulated CW optical beam then propagates through the optical output port 510.

An optical transmission signal propagating in an optical fiber, waveguide, or free space is received by the optical transmission signal input port 506 and is then fed to the input of the photodetector 514. The photodetector 514 generates a RF transmission signal. The driver amplifier 516 amplifies the RF transmission signal to a level that is suitable for radiation by the antenna 512. The amplified transmission signal propagates through the TW electrode structure 518 in a direction that is opposite to the velocity match direction. Consequently, the transmission signal in the antenna interface 500 is relatively inefficient at modulating the optical wave. However, the reduction in modulation efficiency increases the transmit-receive isolation of the antenna interface 500.

The transmit-receive isolation is a function of several parameters. The transmit-receive isolation is a function of the direction of propagation. For example, the sensitivity of the MZ modulator 502 to the electrical signal propagating in a direction that is opposite to the optical signal is lower than the sensitivity of the MZ modulator 502 to the electrical signal propagating in the direction of the optical signal.

The transmit-receive isolation is also a function of the optical power of the CW optical signal. In embodiments where simultaneous transmission and reception are not required, the transmit-receive isolation can be increased by reducing the optical power during transmission. For example, in the limit where the CW laser 518 is inactive, the transmit-receive isolation would be infinite. Thus, by pulsing the CW laser 518 on and off, the antenna interface 500 of the present invention can implement the equivalent of an ideal (i.e., with infinite isolation in the off mode) electronic switch between receive and transmit modes.

Figure 6:
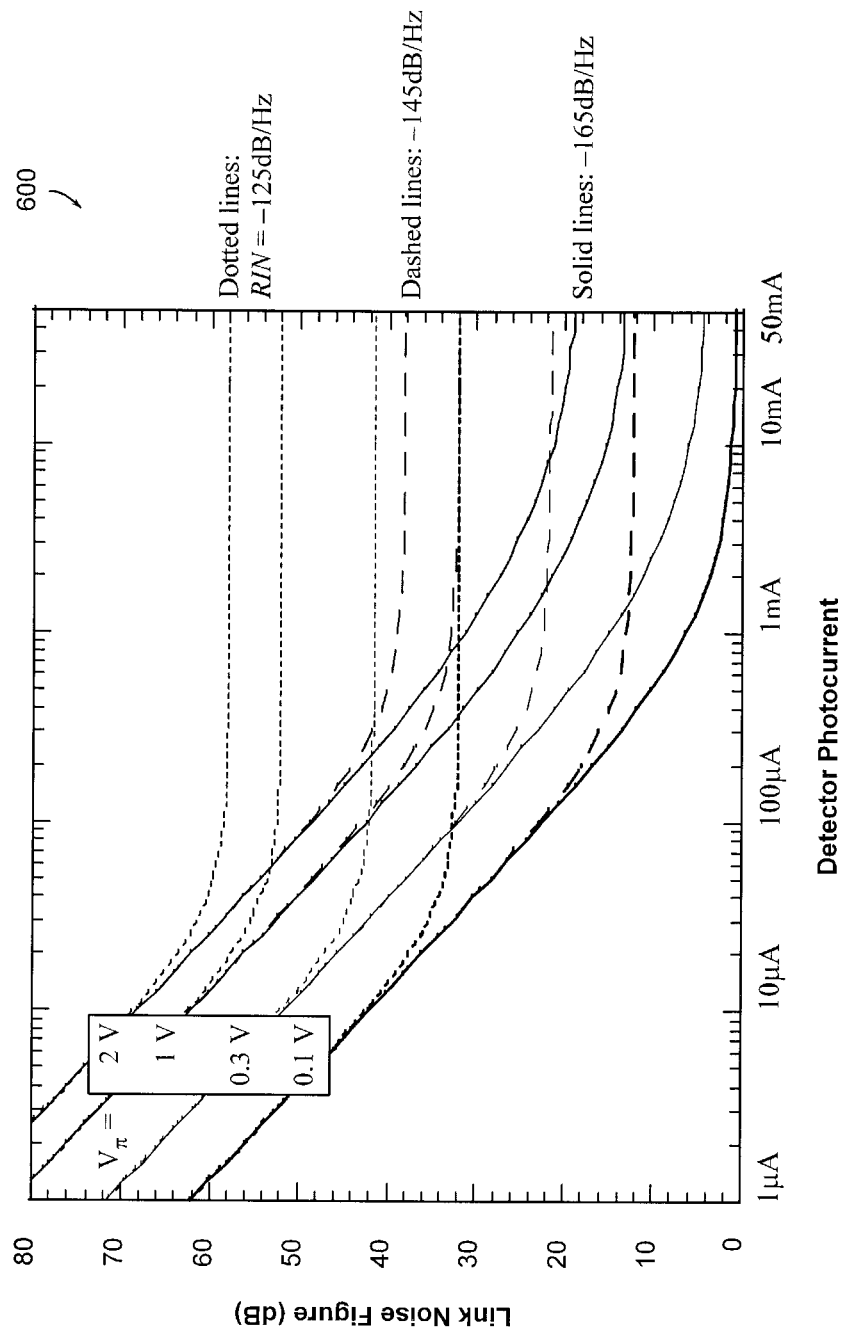
FIG. 6 illustrates graphs of calculated link noise figure as a function of average link photodetector current for a receive link including the laser and MZ modulator that are described in connection with FIG. 5 and a p-i-n photodiode detector.

FIG. 6 illustrates graphs 600 of calculated link noise figure as a function of average link photodetector current for a receive link including the laser 518 and MZ modulator 502 that are described in connection with FIG. 5 and a p-i-n photodiode detector. The graphs are presented for various values of modulator $V_\pi$ and relative intensity noise (RIN) for the laser.

The graphs 600 indicate that modulators meeting the requirement of $V_\pi<0.3$ V will enable links having noise figures that are less than 5 dB when the photodetector connected to the output of the receive link has a current that is >10 mA and when the laser's relative intensity noise (RIN) is sufficiently low. Using such a modulator in the antenna interface of the present invention would result in a low noise figure antenna interface. Thus, the antenna interface of the present invention can be constructed to have a low noise figure without the necessity of a LNA. Also, the antenna interface of the present invention does not include an electronic circulator, so there is no increase in noise figure resulting from an electronic circulator.

The antenna interface of the present invention can be used to construct a relatively low noise figure communication link. There are three dominant sources of noise in a communication link using the electro-optic bi-directional antenna interface of the present invention. The first source of noise is the relative intensity noise (RIN) generated by the CW laser 420 (FIG. 4E). The second source of noise is noise generated by the termination impedance 464. The third source of noise is thermal noise generated by the electrical transmission line 418.

The RIN generated by the CW laser 420 can be reduced to negligible levels by selecting a laser with low RIN, such as a solid-state laser. At frequencies above the lowest frequency in the desired bandwidth of the antenna interface, the noise generated by the termination impedance 464 is insignificant because the noise is ineffective at modulating the optical carrier. Ineffective modulation occurs because the noise generated by the termination impedance propagates in the un-matched direction (i.e. propagating in a direction that is opposite to the velocity matched direction). The thermal noise generated by the ohmic loss in the traveling wave electrodes is integrated along the length of the electrodes.

Broadband low noise amplifiers with noise figures that are less than 2 dB are commercially available. Passive fiber optic links (i.e., links without active electronic or optical amplifiers) typically have relatively high noise figures, which can be on the order of 20 to 30 dB for wide-bandwidth links. The noise figure limit for a passive optical link (i.e. a link without a LNA) is equal to 3 dB if the impedance of the modulator's lumped element electrode is properly matched to the input impedance. See, for example, C. Cox, et al., "Relationship Between Gain and Noise Figure of an Optical Analog Link," *IEEE MTT-S Int. Microwave Symp. Dig.*, San Francisco, Calif., pp. 1551-1554, June 1996.

Noise figure reduction techniques can be used to reduce the noise figure below 3 dB in a passive optical link. For example, an impedance mismatch between a source and the input to a lumped-element electrode structure of the modulator can be used to reduce the noise figure. See, for example, E. Ackerman, et al., "Input Impedance Conditions for Minimizing the Noise Figure of an Analog Optical Link," *IEEE MTT-S Int.*

*Microwave Symp. Dig.*, Denver, Colo., pp. 237-240, June 1997. A record noise figure of 2.5 dB was achieved using the technique described in this paper.

Impedance mismatch techniques, however, have some limitations. For example, impedance mismatch techniques are inherently low-frequency and/or narrow-bandwidth techniques. Furthermore, the impedance mismatch introduced into the system can have undesirable side effects. For example, an impedance mismatch can cause degradation of the antenna pattern.

The minimum achievable noise figure, which is the noise figure that can be achieved when the link gain is sufficiently high and the laser RIN is sufficiently low, for a link with a traveling-wave modulator can be written as follows:

$$NF_{min} = 10 \log [1+x],$$

where x can be expressed as:

$$x = \frac{\sin^2(2\pi f n L_{electrode}/c)}{(2\pi f n L_{electrode}/c)^2} + \left[\frac{\alpha L_{electrode}}{1-e^{-\alpha L_{electrode}}}\left(1+\frac{2}{\alpha L_{electrode}}\right.\right.$$
$$\left.\left.\left[\ln\left(1+\sqrt{1-e^{-\alpha L_{electrode}}}\right)-\sqrt{1-e^{-\alpha L_{electrode}}}\right]\right)\right]^2$$

The $$[\sin(x)/x]^2$$

term represents the effects of the counter-propagating noise generated by the termination impedance. The remaining term represents the effect of thermal noise generated by the electrode's ohmic losses that result in some microwave attenuation per unit length $\alpha$.

Figure 7A:
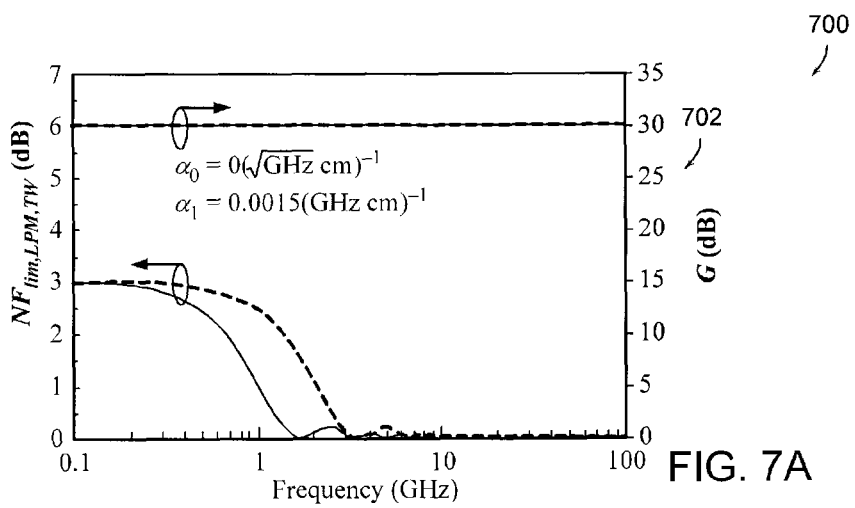
FIG. 7A-C illustrates graphs of calculated gain and minimum (i.e., RIN=0) noise figure vs. frequency for a link consisting of a CW laser, MZ modulator with traveling-wave electrodes, and a p-i-n photodiode detector.
Figure 7B:
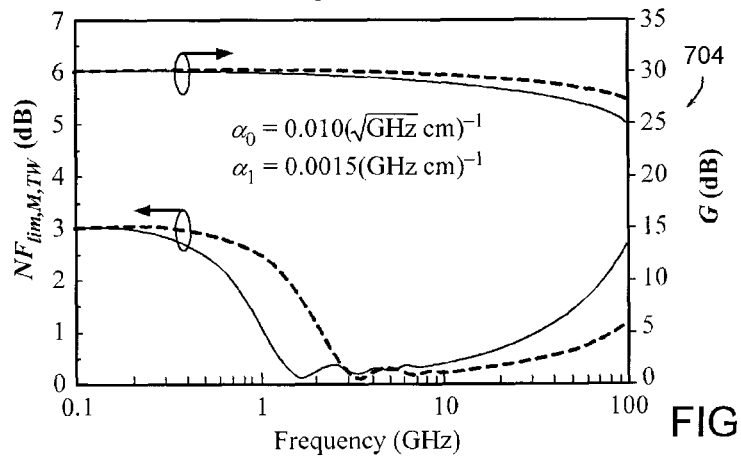
Figure 7C:
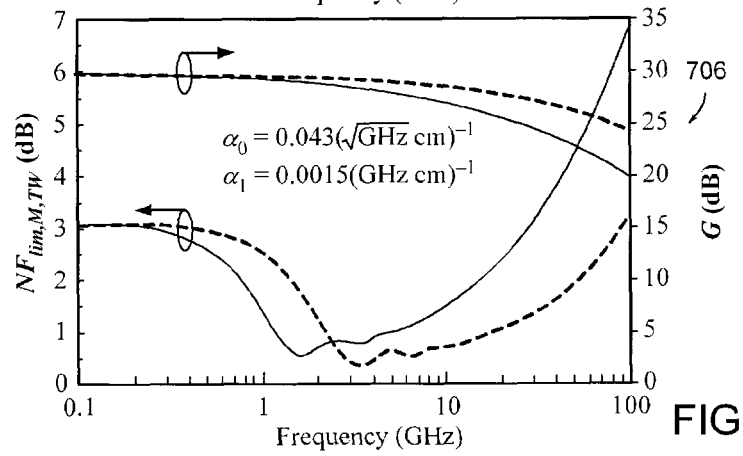

FIG. 7A-C illustrate graphs 700 of calculated gain and minimum (i.e., RIN=0) noise figure data vs. frequency for a link consisting of a CW laser, MZ modulator with traveling-wave electrodes, and a p-i-n photodiode detector. The data assumes values of $V_\pi$ and average photodetector current that cause the link gain to be equal to 30 dB at a frequency of 100 MHz. Calculated results are shown in the graphs 700 for two values of electrode length. Data for a two centimeter electrode is represented by dotted lines and data for a four centimeter electrode length is represented by dashed lines. The value of $\alpha_1$ is assumed to be equal to 0.0015 GHz$^{-1}$ cm$^{-1}$ for all graphs. The graph 702 presents data for oz equal to 0 GHz$^{-1/2}$ cm$^{-1}$. The graph 704 presents data for $\alpha_0$=0.010 GHz$^{-1/2}$ $^1$ $^{cm-1}$. The graph 706 presents data for $\alpha_0$=0.043 GHz$^{-1/2}$ cm$^{-1}$.

The graphs 702, 704, and 706 indicate that it is possible to break the 3 dB noise figure limit for a passively matched optical link over a relatively broad bandwidth. Intuitively, the reason for this result is that the same effects that are providing the transmit-receive isolation are also providing isolation from the noise generated by the termination impedance 464 at the end of the electrical waveguide 418 (FIG. 4E). The noise generated by the termination impedance 464 typically is responsible for causing the 3 dB noise figure limit. Therefore, eliminating (or at least significantly reducing) the noise generated by the termination impedance 464 permits one to achieve a link noise figure of less than 3 dB.

The electro-optic signal and antenna interface of the present invention has numerous important features. For example, the antenna interface of the present invention does not include a LNA. Eliminating the LNA results in a significantly simpler antenna interface and eliminates possible amplifier damage that can be caused by high transmission power. Also, the electro-optic antenna interface of the present invention does not include an electronic circulator. Eliminating the electronic circulator reduces the weight of the interface and can increase the transmit-receive isolation and/or the operating bandwidth.

Furthermore, the electro-optic antenna interface of the present invention can be designed to provide narrowband or wideband operation. Also, the electro-optic antenna interface of the present invention can provide a receiver antenna interface with a relatively low noise figure and can provide a transmitter interface with a moderate power level. Furthermore, the electro-optic antenna interface of the present invention has relatively low loss and high transmit-receive isolation.

The signal and antenna interface of the present invention has numerous other features. For example, the signal and antenna interface of the present invention is inherently wideband as described herein and the bandwidth can be extended to relatively high frequencies. The signal and antenna interface of the present invention is also relatively small in size and light in weight as described herein. For example, the only components that need to be physically mounted on the antenna element are the modulator 502 and the transmit driver 516. A power amplifier can be included if higher transmit powers are required. The CW laser 518 can be positioned in a remote location and can be coupled to the antenna interface via an optical fiber. The conventional electronic feed into the antenna interface can be eliminated completely if the transmission signal to the antenna interface is coupled via an optical fiber.

The antenna interface of the present invention has numerous applications. For example, the antenna interface of the present invention can be used for thin aperture antennas for conformal antenna arrays. Also, the antenna interface of the present invention is particularly suitable for airborne and spaceborne platforms because it is relatively small in size and light in weight. For example, the weight of a transmit-receive module including the antenna interface of the present invention can be less than 10 percent of the weight of a conventional transmit/receive module.

Equivalents

While the invention has been particularly shown and described with reference to specific preferred embodiments, it should be understood by those skilled in the art that various changes in form and detail may be made therein without departing from the spirit and scope of the invention as defined herein.

We claim:

1. A multi-frequency broad band electrical bi-directional signal interface comprising a traveling wave distributed amplifier having a RF input port that receives a RF transmission signal, a RF bi-directional port that receives a RF reception signal and that transmits the RF transmission signal, and a RF output port, the traveling wave distributed amplifier coupling the RF reception signal to the RF output port in a substantially non-reciprocal manner where the RF reception signal propagates as a traveling wave and is amplified, and passing the RF transmission signal to the RF bi-directional port where the RF transmission signal propagates as a traveling wave.

2. The signal interface of claim 1 wherein substantially all of the RF transmission signal passes to the RF bi-directional port.

3. The signal interface of claim 1 wherein the RF bi-directional port receives and amplifies the RF reception signal and passes the RF transmission signal simultaneously in time.

4. The signal interface of claim 1 further comprising an antenna that is electrically connected to the RF bi-directional port.

5. A method of transmitting and receiving signals, the method comprising:
   receiving a broadband RF reception signal at a RF bi-directional port;
   receiving a broadband RF transmission signal at an RF input port; and
   electronically coupling the RF reception signal to a RF output port in a non-reciprocal manner where the RF reception signal propagates as a traveling wave and is amplified, and passing the RF transmission signal to the RF bi-direction port where the RF transmission signal propagates as a traveling wave.

6. The method of claim 5 wherein the receiving the RF reception signal at the RF bi-directional port and the passing the RF transmission signal to the RF bi-directional port are performed substantially simultaneously in time.

7. The method of claim 5 wherein the electronically coupling the RF reception signal to the RF output comprises amplifying the RF reception signal.

8. The electrical bi-directional signal interface of claim 1 wherein the distributed amplifier is configured so that it has gain in one direction and substantial loss in the other direction.

9. The electrical bi-directional signal interface of claim 1 wherein the distributed amplifier comprises a high-gain wide-bandwidth amplifier.

10. The electrical bi-directional signal interface of claim 1 wherein the distributed amplifier comprises a first and a second traveling-wave waveguide that are electrically coupled with a plurality of amplifier stages.

11. The electrical bi-directional signal interface of claim 10 wherein outputs of the plurality of amplifier stages in the distributed amplifier are coupled together by feeding taps placed along the second traveling-wave waveguide.

12. The electrical bi-directional signal interface of claim 10 wherein an output of the first traveling-wave waveguide is terminated by its characteristic impedance.

13. The electrical bi-directional signal interface of claim 10 wherein the RF input port is electrically connected to an input of the first traveling-wave waveguide, the RF bi-directional port is electrically connected to an output of the second traveling-wave waveguide, and the RF output port is electrically connected to an input of the second traveling-wave waveguide.

14. The electrical bi-directional signal interface of claim 10 wherein the RF input port is electrically connected to an output of the first traveling-wave waveguide, the antenna is connected to the input of the first traveling-wave waveguide, and the RF output port is electrically connected to an output of the second traveling-wave waveguide.

15. The method of claim 5 wherein substantially all of the RF transmission signal passes to the RF bi-directional port.

16. The method of claim 5 wherein the receiving the RF reception signal at the RF bi-directional port comprises receiving the RF reception signal with an antenna.

17. The method of claim 5 wherein the electronically coupling the RF reception signal to the RF output port in the non-reciprocal manner comprises tapping off a portion of energy in the reception signal and feeding the tapped off portion of energy into a low-gain amplifier stages so as to produce an amplified output signal.

18. The method of claim 5 further comprising blocking a portion of the RF transmission signal from the RF output port.

* * * * *